No. 839,816.  
PATENTED JAN. 1, 1907.  
F. A. DECKER.  
ELECTROCHEMICAL APPARATUS.  
APPLICATION FILED MAR. 9, 1905.  
2 SHEETS—SHEET 1.
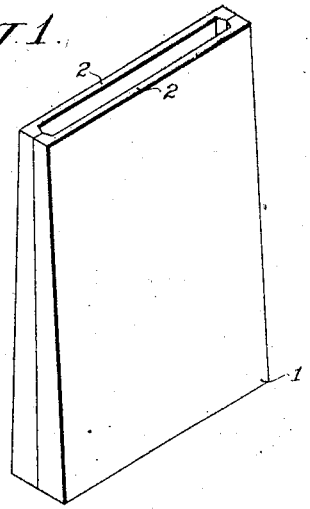
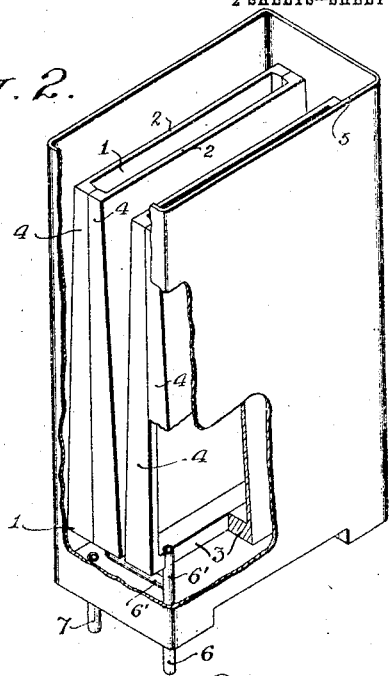
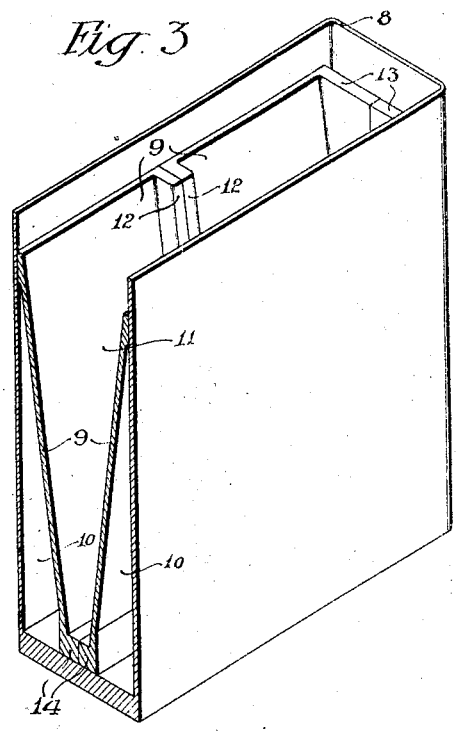
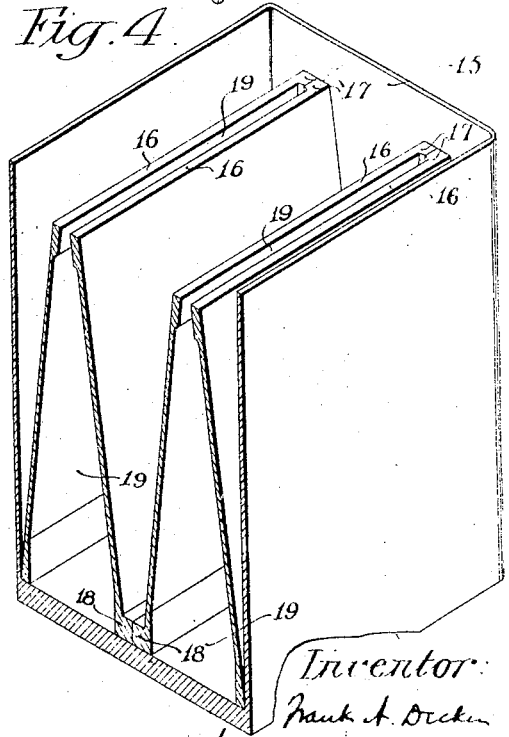

No. 839,816. PATENTED JAN. 1, 1907.
F. A. DECKER.
ELECTROCHEMICAL APPARATUS.
APPLICATION FILED MAR. 9, 1905.
2 SHEETS—SHEET 2.
Fig. 5.
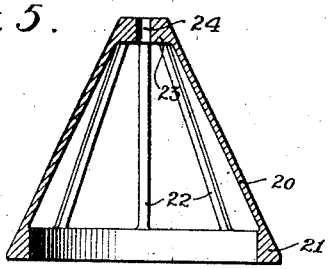
Fig. 7.
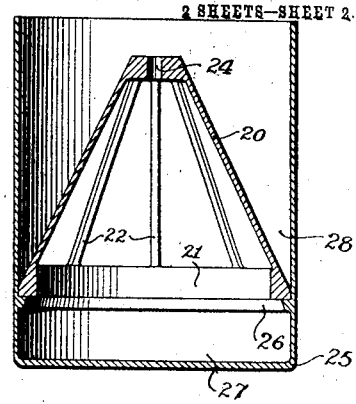
Fig. 6.
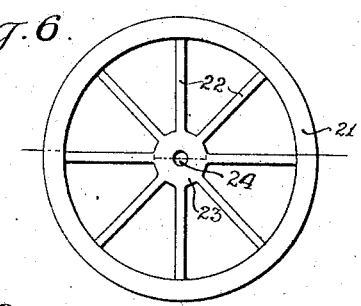
Fig. 10.
Fig. 8.
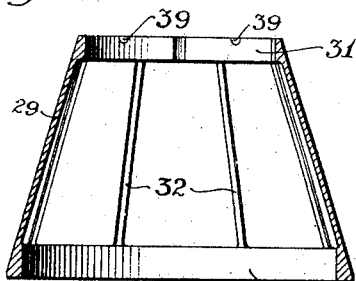
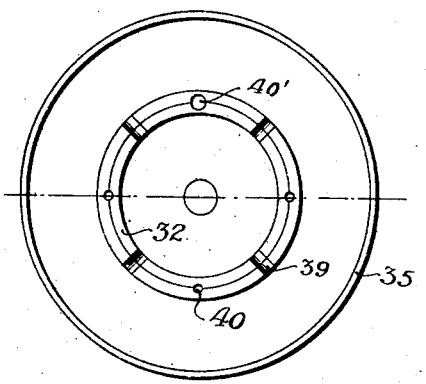
Fig. 11.
Fig. 9.
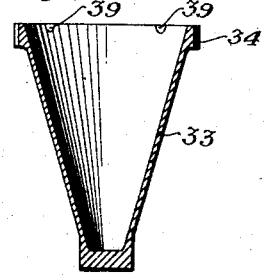
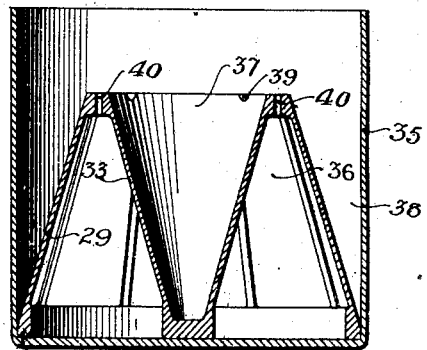
Witnesses:—
Louis V. Buck.
Utley E. Crane Jr.
Inventor:—
Frank A. Decker
by Charles N. Butler
Attorney.

UNITED STATES PATENT OFFICE.

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

ELECTROCHEMICAL APPARATUS.

No. 839,816. Specification of Letters Patent. Patented Jan. 1, 1907.

Application filed March 9, 1905. Serial No. 249,222.

*To all whom it may concern:*

Be it known that I, FRANK A. DECKER, a citizen of the United States, residing at Philadelphia, in the county of Philadelphia and State of Pennsylvania, have invented certain Improvements in Electrochemical Apparatus, of which the following is a specification.

This invention is designed to provide electrochemical fluid-containing means such that there will be compensation for the variable endosmotic action taking place at different depths in the electrochemical fluid.

In the electrochemical diffusion of fluids through porous diaphragms the rate of diffusion at different elevations varies with the depth or fluid-pressure and results in a gradually-increasing exhaustion of the fluid from the surface downward. This characteristic action results in a gradual decrease of energy and efficiency in the electrochemical action.

It is the leading object of this invention to provide means for extending the electrochemical energy and efficiency.

To this end I have provided an improved container which may be embodied in various forms comprising in whole or in part porous material, providing increasing cross-sectional areas and increasing depths of the fluid acting through the porous diaphragm or diaphragms.

It is a further object of my invention to provide in such apparatus low resistance to the endosmotic action, mechanical strength, compactness of apparatus, and facility in construction, assemblage, and dissociation.

The nature and characteristic features of the invention will appear from the following description and the accompanying drawings in illustration thereof, of which—

Figure 1 is a perspective view of a container made in accordance with my invention. Fig. 2 is a broken perspective view of a cell provided with the improved containers. Fig. 3 is a perspective view showing a section of a cell provided with a modified form of container. Fig. 4 is a perspective view showing a section of a cell employing a developed form of the idea illustrated in Fig. 3. Fig. 5 is a vertical sectional view, and Fig. 6 is a bottom plan view, of a conical diaphragm made in accordance with the invention. Fig. 7 is a vertical sectional view of a cell having compartments formed therein by the diaphragms shown in Figs. 5 and 6. Figs. 8 and 9 are vertical sectional views of parts of a compound diaphragm or containing apparatus, showing a development of the structure illustrated in Figs. 5 and 6; and Fig. 10 is a top plan, and Fig. 11 a vertical sectional view, of a cell containing the assembled parts shown separately in Figs. 8 and 9.

As shown in Figs. 1 and 2, the container 1 has the form of a truncated wedge, being composed of the diaphragms 2, having the wide base-flanges 3, sealed together to form a wide bottom, and the gradually-decreasing end flanges 4, which are sealed together to form the ends of a container having a comparatively small cross-sectional area at the top, gradually increasing toward the bottom. Such containers, providing cups for holding the heavy electrochemical fluid, may be disposed in parallel relation in an envelop or jar 5, so that the electrochemical fluid circulates about them. The conduit 6, passing through the bottom of the envelop, has the branches 6' communicating with the cups, and the conduit 7, passing through the bottom of the envelop and communicating with the space exterior to the cups, provide means for changing the fluids.

As shown in Fig. 3, the envelop 8 has resting upon its bottom and sides the diaphragms 9, disposed therein so as to provide the two exterior containing-spaces 10, increasing in cross-sectional area from top to bottom, and between them the oppositely-disposed wedge-shaped container 11. The diaphragms may be formed in sections, having the reinforcements or flanges 12, which are sealed together to close the intermediate joints, the tapering flanges 13, which are sealed together to close the ends, and the reinforcements or flanges 14, which are sealed together to form the bottom of the cup.

As shown in Fig. 4, the envelop 15 has the diaphragms 16 supported therein and joined together by sealing the registering end flanges 17 and the bottom flanges or reinforcements 18, the outer diaphragms being sealed to the envelops, so that there is no communication between the compartments 19 and the space in the envelop exterior thereto.

As shown in Figs. 5, 6, and 7, the container may employ the conical diaphragm 20, having the bottom reinforcement or flange 21 and the body-flanges or reinforcing-ribs 22 converging therefrom to the top 23, having the opening 24 therein. This diaphragm is supported in the cylindrical envelop 25 by the circular flange 26, to which it is sealed, thus providing the interior compartment 27 and the exterior compartment 28.

As shown in Figs. 8, 9, 10, and 11, the conical-diaphragm construction may be compounded by providing the truncated conical diaphragm 29, having the bottom flange or reinforcement 30 and the top flange or reinforcement 31 joined by the ribs 32 and by fitting within this diaphragm the oppositely-disposed conical diaphragm 33, having the flange or reinforcement 34 sealed to the corresponding part 31. This compound structure is supported in the envelop 35, to which the flange 30 is sealed, so as to form the compartment 36, increasing in cross-sectional area from the top to the bottom, and the enveloping compartments 37 and 38, communicating through the overflow-channels 39, the compartment 36 being provided with the fluid and terminal openings 40 and 40'.

It will be understood from the foregoing description and the accompanying drawings that the characteristic idea of the invention may be embodied in various forms by plain, reinforced, curved, simple, sectional, or compounded diaphragms, which may be made of either conducting or non-conducting porous material, as required for the operation desired.

Having described my invention, 1 claim—

1. In electrochemical apparatus, a fluid-container comprising a porous structure, said container having increasing cross-sectional areas at increasing depths.

2. In electrochemical apparatus, a fluid-container comprising a porous diaphragm, said container having sides diverging downwardly.

3. In electrochemical apparatus, an envelop, and a diaphragm disposed in said envelop to provide an electrochemical fluid-container having a cross-sectional area varying directly with the pressure of the fluid at different depths in said container.

4. In electrochemical apparatus, an envelop, and a plurality of diaphragms disposed in said envelop to form fluid-containing means increasing downwardly in cross-sectional area.

5. In electrochemical apparatus, a wedge-shaped container comprising a porous diaphragm.

6. In electrochemical apparatus, a container comprising porous diaphragms having tapering flanges sealed together.

7. In electrochemical apparatus, a container comprising porous diaphragms having bottom flanges and tapering side flanges sealed together.

8. In electrochemical apparatus, a diaphragm having an edge with a tapering flange adjacent to and extending along said edge, said flange being disposed transversely to the body of said diaphragm.

9. In electrochemical apparatus, a diaphragm having a bottom flange and tapering side flanges thereon, said flanges being disposed transversely to the body of said diaphragm.

In testimony whereof I have hereunto set my hand, this 4th day of March, 1905, in the presence of the subscribing witnesses.

FRANK A. DECKER.

Witnesses:
JOHN THIEL,
UTLEY E. CRANE, Jr.